Sept. 9, 1924. 1,507,691
C. SLAVENS
SPARE WHEEL CARRIER FOR VEHICLES
Filed June 5, 1923
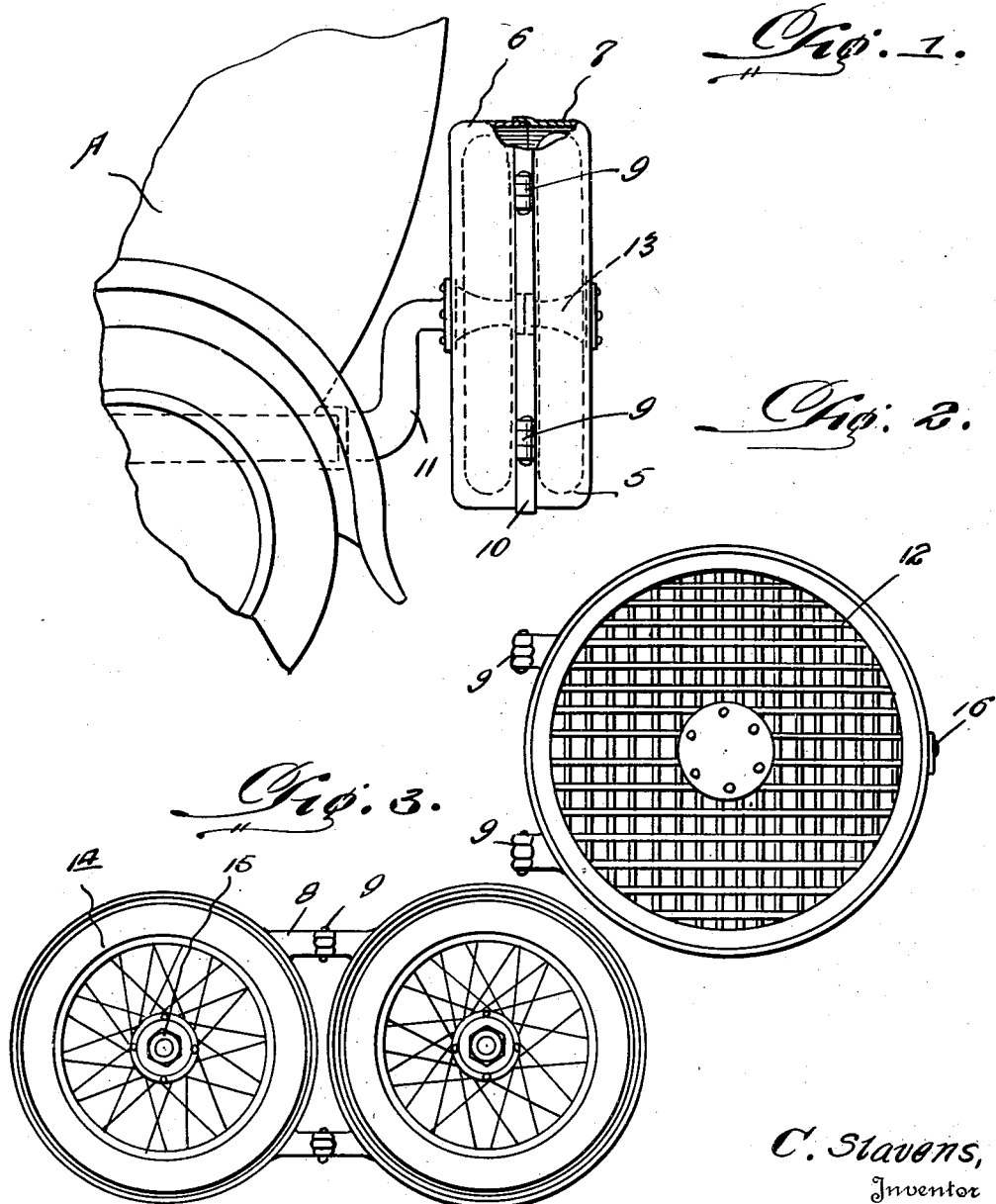

Patented Sept. 9, 1924.

1,507,691

UNITED STATES PATENT OFFICE.

CECIL SLAVENS, OF MART, TEXAS.

SPARE-WHEEL CARRIER FOR VEHICLES.

Application filed June 5, 1923. Serial No. 643,511.

*To all whom it may concern:*

Be it known that I, CECIL SLAVENS, a citizen of the United States, residing at Mart, in the county of McLennan and State of Texas, have invented certain new and useful Improvements in Spare-Wheel Carriers for Vehicles, of which the following is a specification.

In carrying out the present invention, it is my purpose to provide a carrier for the spare wheels of motor vehicles, whereby any liability of the same being stolen is overcome, and wherein the same are carried in such a manner that the same will not rust or deteriorate by rain or dirt collecting thereon.

The primary object of the invention is the provision of a carrier for the spare wheels of vehicles that is extremely simple of construction, and one that is of such a nature as to permit of the ready positioning or removal of the wheels.

The nature and advantages of the invention will be better understood when the following detailed description is ready in connection with the accompanying drawing, the invention residing in the construction, combination, and arrangement of parts as claimed.

In the drawing forming part of this application, like numerals of reference indicate similar parts in the several views, and wherein:

Figure 1 is a side elevation, partly in cross section of my improved carrier supported upon the rear end of a motor vehicle.

Figure 2 is a front elevation of the outermost section comprising the carrier and Figure 3 is an elevation of the carrier in open position, each of the sections being shown as supporting a spare wheel.

With particular reference to the drawing, my novel wheel carrier designated generally 5 is of circular shape and embodies a pair of sections 6 and 7, each of which are formed with outwardly extending mating arms 8, that are hingedly joined together at 9. The outermost section 7 is formed at its inner edge with a raised inwardly extending skirt portion 10 that overlaps the adjacent edge of the section 6 when the carrier is closed for providing a water and dirt proof joint.

The innermost section 6 is rigidly secured to one end of a supporting arm 11, that is in turn rigidly secured at its opposite end to the frame of the motor vehicle A. The outermost section 7 includes a wall 12 of grill work, and extending inwardly from the center of each of said sections 6 and 7 is a conical element 13, the inner end of each being screw threaded, these conical elements adapted for engagement through the usual hubs or wire or disk wheels 14, and adapted for receiving at their screw threaded ends, the usual wheel hub caps 15, whereby these wheels are maintained in position within the sections 6 and 7.

A suitable form of lock 16 is provided between the sections 6 and 7, whereby they may be maintained in a closed position for preventing the carrier from being opened and the wheels consequently stolen.

In view of the above description, it will be at once apparent that I have provided a highly novel form of wheel carrier, and one that will answer all of the purposes above ascribed, and even though I have herein set forth the most practical embodiment of the present invention, it is nevertheless to be understood that minor changes may be made therein, without departing from the spirit and scope of the invention as claimed.

Having thus described my invention, what I claim as new, and desire to secure by Letters Patent, is:

A carrier for spare wheels comprising a casing composed of a pair of symmetrical half-sections hingedly connected together, each section being shaped to conform to the shape of the wheel which it is adapted to contain and the outer side of each section being in the form of an open work grid, and each of said grids carrying opposed studs shaped to receive the wheel hubs, and the inner adjacent end of said studs being screw threaded to receive the usual hub cap for maintaining the wheels in place.

In testimony whereof I affix my signature.

CECIL SLAVENS.